Patented Nov. 1, 1949

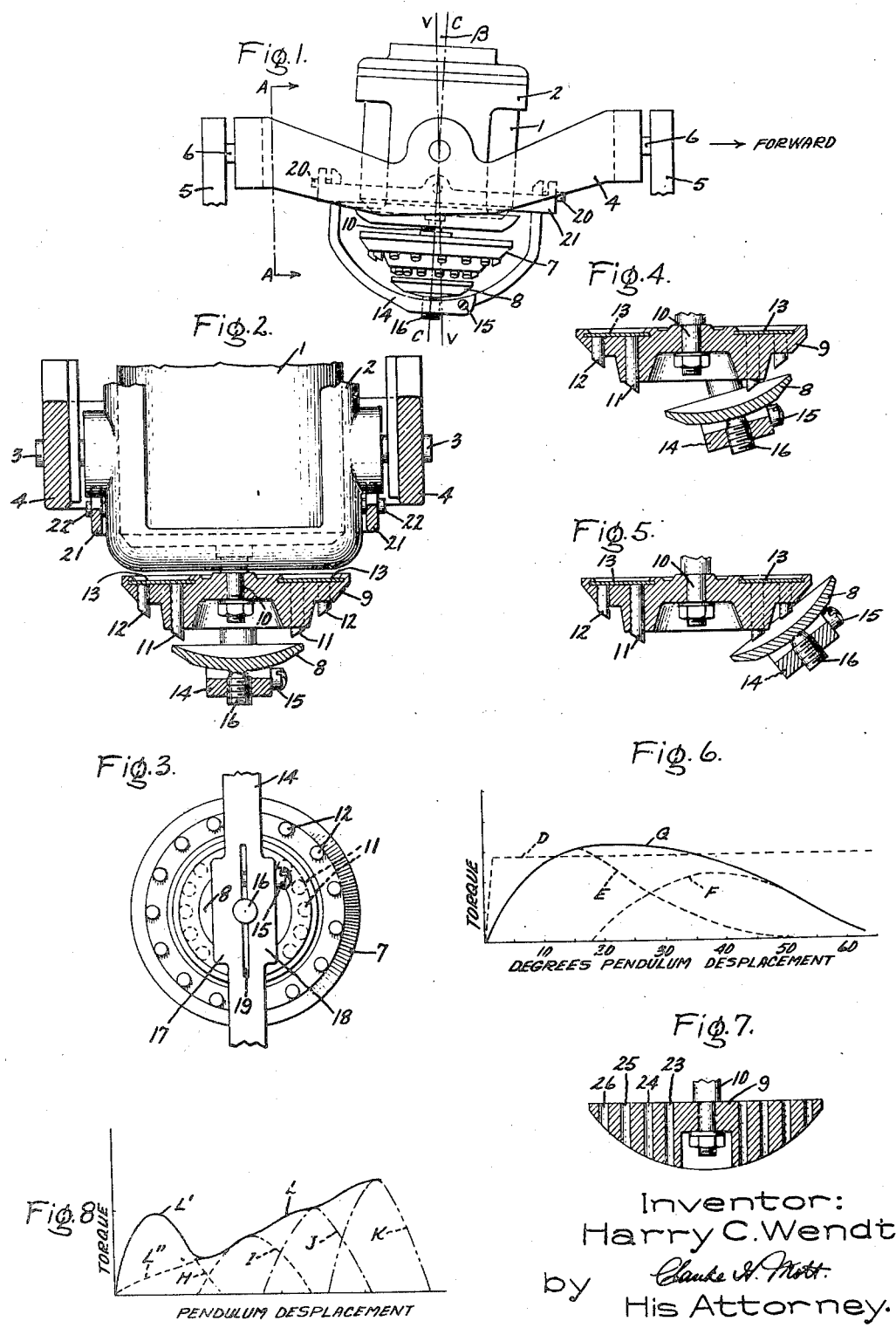

2,486,897

UNITED STATES PATENT OFFICE 2,486,897

GYROSCOPE ERECTING DEVICE

Harry C. Wendt, Lynnfield, Mass., assignor to General Electric Company, a corporation of New York Application December 22, 1945, Serial No. 636,672

10 Claims. (Cl. 74—5.46)

The present invention relates to gyroscopes and more particularly to an improved erecting device for gyroscopes of the vertical spin axis type.

Gyroscopes of the vertical spin axis type, which are sometimes referred to as gyro verticals, are customarily provided with an erecting device for maintaining the spin axis of the gyroscope approximately in the vertical reference position. A common type of erecting device comprises an eddy current disk mounted on and driven by the gyroscope, the disk cooperating with a permanent magnet which is mounted to swing beneath the disk as a pendulum. Eddy currents are induced in the disk resulting in drag torques which precess the gyroscope into correspondence with the gravity positioned magnet whereby the gyroscope is slowly and continuously erected to and maintained in the reference position. With such an erecting device involving a gravity positioned element, an error known as "turn error" is encountered when the gyroscope is used on a moving vehicle such as an aircraft. This error is caused by the fact that the pendulum is swung away from the true vertical by centrifugal action during turns so that the gyroscope is precessed away from its true reference position. It has been found that this error can be greatly reduced or eliminated under a variety of predetermined conditions of operation by the expedients of initially tipping the spin axis of the gyroscope in the direction of the motion of the vehicle and by designing the erection system so that a predetermined relationship is obtained between the displacement of the pendulum and the precession rate of the gyroscope.

In U. S. Patent No. 2,418,032 in the name of R. G. Jewell, issued March 25, 1947, which is assigned to the same assignee as the present invention, there is disclosed an erecting device for a gyro vertical in which the desired torque versus pendulum displacement characteristic required for turn error compensation is obtained by a special shaping of the eddy current disk. By properly shaping the disk it is possible to obtain an effective air gap between the magnet and disk which varies in accordance with the displacement of the pendulum. Since the magnitudes of the induced eddy currents, and consequently the net drag torque, vary with the air gap, the desired variation of torque with displacement can be obtained. However, in mass production of gyroscopes it has been found difficult to maintain the erection characteristic constant with this arrangement because of the fact that the erecting device is very sensitive to the initial air gap adjustment between the magnet and the eddy current disk. Furthermore, the shape of the disk may change slightly as the forming tool used to manufacture the disk wears and this tends to produce error. Since the torque varies very rapidly with air gap any initial error in adjustment causes a rather wide departure from the desired torque versus displacement characteristic.

An object of the present invention is to provide an improved erecting device for a gyroscope.

Another object is to provide a gyroscope erecting device which can be easily designed and adjusted to give any desired erection characteristic.

A further object is to provide an eddy current erecting device which is not sensitive to the initial adjustment of the air gap between the magnet and the eddy current disk.

A still further object is to provide an erecting device having a wide range of operation and freedom and which requires but a small amount of space so that it can be incorporated in instruments of restricted dimensions such as aircraft instrument gyroscopes.

Further objects and advantages of my invention will become apparent and my invention will be better understood from the following description referring to the accompanying drawing, and the features of novelty which characterize my invention will be pointed out with particularity in the claims annexed to and forming a part of the specification.

In the drawing Fig. 1 is a side elevation view of a gyroscope provided with an erecting device embodying the present invention.

Fig. 2 is a sectional view of the device shown in Fig. 1 looking in the direction of the arrows A—A.

Fig. 3 is a bottom view of the erecting device shown in Figs. 1 and 2.

Fig. 4 shows the erecting device with the pendulum displaced from the center as during a turn.

Fig. 5 is similar to Fig. 4 except that the pendulum is further displaced from the center.

Fig. 6 is a graphical representation useful in describing the operation of the invention.

Fig. 7 shows a modified arrangement of the magnet rotor.

Fig. 8 is a graphical representation useful in describing the operation of the modified magnet rotor arrangement.

Referring to Fig. 1 of the drawing I have shown a gyroscope of the vertical spin axis type which may, for example, be embodied in an aircraft instrument known as an artificial horizon. The gyroscope is shown as comprising a rotor 1 which is mounted in a rotor bearing frame 2 so that the rotor is free to rotate about the gyroscope spin axis indicated by the dash line C—C. The gyroscope is driven by any suitable motor means such as an electric or pneumatic motor (not shown). The rotor bearing frame 2 is provided with horizontally extending trunnions 3 which are pivotally mounted on a gimbal 4 so as to permit pivotal movement of the bearing frame about the horizontal axis defined by the trunnions 3. The gimbal 4 is in turn pivotally mounted on fixed supports 5 by means of trunnions 6 so that the gimbal is free to pivot around a horizontal axis defined by the trunnions 6—6 which is at right angles to the pivotal axis defined by the trunnions 3—3. There is thus provided a conventional Cardan suspension which permits universal movement of the gyroscope relative to the fixed supports 5. Due to gyroscopic inertia, the gyroscope tends to maintain the orientation of its spin axis C—C fixed in space.

Because there is a certain amount of friction in the trunnion bearings and also because of rotation of the earth the gyroscope tends to wander from its reference position and it is therefore necessary to provide an erecting device for maintaining the spin axis of the gyroscope in the reference position.

According to the present invention I have provided a novel and improved erecting device comprising a rotating magnet member 7 and a pendulously mounted cooperating eddy current disk 8. As shown the magnet member 7 comprises a frusto-conically shaped base member 9 which is mounted on and secured to an extension 10 of the shaft which supports the gyro rotor 1. The base member 9 therefore rotates with the gyro rotor 1 about the spin axis of the gyroscope.

In order to provide a moving magnetic field to react upon the eddy current disk 8, there are mounted on the base member 9 a plurality of rod-shaped permanent magnets 11 and 12. The magnets 11 and 12 are mounted on the base member 9 as by pressing them into suitable holes in the base member, the magnets being of such length that the lower ends project downwardly beyond the surface of the base member 9 to form salient pole pieces as shown. The magnets 11 and 12 are held in position by a back plate 13 which is held in position in any suitable manner as by peening over the adjacent edge of the base member 9. Preferably, although not necessarily, the back plate 13 is formed of magnetic material so as to provide a low reluctance return path for magnetic flux flowing between the magnets. The magnets are mounted with their axes substantially parallel to the rotational axis of the magnet member 7 so that as the magnet member rotates, there is provided a rotating downwardly extending magnetic field which is substantially symmetrical about the spin axis of the gyroscope. It will be noted that the magnets 11 and 12 are arranged in circles of different diameters, the circles being concentric with the axis of rotation of the magnet member 7. The number, strength and spacing of the magnets 11 and 12 are selected such that a predetermined flux pattern is obtained which extends downwardly from the lower surface of the magnet member 7. The reason for selecting a predetermined flux pattern will become apparent as the description proceeds.

The eddy current disk or cup 8 is formed of a suitable electrically conducting material, such as copper or aluminum. The eddy current disk is mounted so that it is free to swing in any direction adjacent the lower surface of the magnet member 7 under the influence of gravity. To this end the disk 8 is rigidly mounted on a pendulum or bail 14 by means of a screw 15, which acts to clamp in threaded engagement a screw 16 extending downwardly from the disk between two portions 17 and 18 of the lower portion of the bail 14 which are separated by a slot 19. The vertical position of the disk can be adjusted by rotating the screw 16 after the clamping screw 15 has been released.

In order to obtain universal movement to the pendulum assembly, the bail 14 is provided with trunnions 20 by means of which the pendulum is pivotally mounted on a supplementary horizontal gimbal member 21. The gimbal member 21 is in turn pivotally mounted on the bearing frame 2 by means of trunnions 22. The axes are determined by the trunnions 22 and 20 and are mutually perpendicular so that universal movement of the pendulum is permitted. It may be pointed out here that it is not necessary to the present invention that the pendulum 14 be mounted on the rotor bearing frame 2 as it may equally well be mounted on the fixed supports 5.

As best shown in the Fig. 3 the eddy current disk 8 is so dimensioned that when it is in the neutral or center position shown in which the axis of the disk is coincident with the axis of rotation of the magnet member 7, the outer edge of the disk just overlaps the downwardly extending pole piece of all the magnets 11 in the inner ring or circle. When the gyroscope is running the magnets 11 produce a rotating magnetic field which induces eddy currents in the disk 8 and as a result there is a reactive drag torque exerted on the magnet member 7. When the disk 8 is in the neutral position the drag torque is symmetrical with respect to the spin axis of the gyroscope so that the net torque tending to precess the gyroscope is zero. However, if relative tilt occurs between the disk and the magnet member, the magnets on the side opposite the direction of tilt are uncovered whereupon the drag torque becomes unbalanced and results in a torque being applied to the gyroscope at right angles to the direction of tilt. As a result of this net torque the gyroscope is precessed in a direction to restore correspondence between the magnet member and the disk. Since the pendulum 14 is positioned by gravity it will be apparent that as a result of the eddy current erecting action that the gyroscope will be continuously precessed to a predetermined reference position in which the axes of the rotary magnet member and the eddy current disk are in correspondence.

As pointed out above, gyro verticals having erecting devices comprising pendulous elements are subject to an error known as turn error when they are mounted on moving vehicles such as aircraft. This error occurs during turns when the pendulous element is swung away from the true vertical by centrifugal action. In order to eliminate or reduce this error under predetermined conditions of operation the pendulum is adjusted so that the spin axis of the gyroscope is normally tipped a small amount in the direction of movement of the vehicle on which the gyroscope is mounted. Referring to Fig. 1 of the drawing, it will be noted that the gyroscope spin axis C—C is tipped away from the true vertical designated by the line V—V, the angle of tip being designated by the symbol β. Normally the angle β is of the order of 2½°. The angle β is measured in a plane parallel to the fore and aft axis of the vehicle on which the gyroscope is mounted which plane includes the true vertical line V—V and the gyro spin axis line C—C. The direction of tip is such that the top of the gyroscope frame leans in a forward direction indicated by the arrow. The tipping of the gyro spin axis in the normal reference position is accomplished by adjustment of the balance of the pendulum 14. Thus in the illustrated embodiment the screw 15 may be selected of proper weight such that when the pendulum is in a position of rest the center of the disk 8 is slightly to the rear of the true vertical line V—V passing through the center of suspension of the gyroscope.

With the spin axis of the gyroscope tipped as shown the effect of turn error can be eliminated if the erecting device is so designed that when the pendulum swings out during a turn the gyroscope is caused to precess about the true vertical at a rate just equal to the rate of turn of the vehicle on which the gyroscope is mounted. If such a relationship is maintained there will be no apparent turn error in the position of the gyroscope since the orientation of the gyroscope spin axis relative to the vehicle on which it is mounted remains unchanged during the turn. One of the principal advantages of the present erecting device comprising multiple concentric rings of magnets 11 and 12 is that the desired gyroscope erection characteristics required for turn error compensation can be easily obtained as will now be described.

As pointed out in the above-mentioned copending Jewell application, complete turn error compensation for all vehicle speeds and one predetermined rate of turn can be obtained if the erecting device is designed so that the precessing torque and hence the precessing rate remains substantially constant for various angles of tilt between the pendulum and the gyroscope which are encountered in normal operation of the device. This desired characteristic is indicated by the dash line or curve D shown in Fig. 6 of the drawing which shows relationship between pendulum displacement or tilt and the precessing torque exerted on the gyroscope. As disclosed in the above-mentioned Jewell application this desired characteristic is approximated by shaping the eddy current disk in such a manner that the air gap between the disk and the magnet varies as the pendulum swings away from the central or neutral position. According to the present invention this desired erection characteristic may be approximated independently of any air gap variation between the eddy current disk and the magnet whereby the erecting device is much less sensitive to initial adjustment and it can be more accurately controlled in mass production.

According to the present invention the desired erection characteristic is obtained by selecting the number, spacing, and strength of the magnets 11 and 12 such that a field pattern is produced by the rotary magnet member 7 which gives the desired erection characteristic. This action can most easily be seen by reference to the curves shown in Fig. 6. The curve E indicates the component of the erection characteristic which is contributed by the magnets 11. It will be noted that for pendulum displacements beyond about 15 degrees, the torque produced by the magnets 11 drops off rapidly until it finally reaches zero at approximately 50 degrees, at which point there would be substantially no overlap between the magnets 11 and the disk 8. From an inspection of the curves D and E, it will be apparent that the torque and gyro precessing rate would be considerably less than that required for turn error compensation for pendulous displacements beyond 17 degrees if but one ring of magnets were used. However, this undesirable action is prevented by the action of the second ring of magnets 12 which produces a torque indicated by the curve F. The diameter of the outer circle of magnets 12 is selected such that overlap between the disk 8 and the magnets 12 begins to occur at the point where the torque developed by the first ring of magnets begins to fall below the desired value indicated by the curve D. In the illustrated embodiment of the invention, this action begins to occur at approximately 17 degrees pendulum displacement, which displacement is indicated in Fig. 4 of the drawing. Referring to Fig. 4, it will be noted that in this position overlap just begins to occur between the edge of the disk 8 and the magnets 12. As indicated by the curves of Fig. 6, from this position increased pendulum displacements result in torques being produced by both rings of magnets, the resultant torque being indicated by the curve formed by the solid line G. It will be noted that the curves E and F are shaped such that the resultant curve G is relatively flat, and approximates the desired curve D up to the maximum normal pendulum displacement which is approximately 40 degrees, this position being shown in Fig. 5 of the drawing.

It should be clearly understood that the relationships shown in Fig. 6 are for the purpose of illustration only and that other relationships may be utilized without departing from my invention. Thus it will be apparent that by varying the diameter of the ring of magnets 12 the curve F can be shifted relative to the curve E. It will also be apparent that by varying the strength and the number of the magnets in the different rings, the peak values of the two curves E and F can be varied. It will be clear, therefore, that by properly selecting these factors, a resultant curve G can be obtained having any desired gyroscope erection characteristic, such as the one illustrated by the curve G in Fig. 6 wherein turn error compensation is obtained for all vehicle speeds at one predetermined rate of turn.

My invention is not limited to an arrangement in which two concentric rings of magnets are used since obviously any number of rings may be used, depending upon the accuracy and shape of the erection curve desired. Thus, for example, there is shown in Fig. 7 of the drawing a modified magnet rotor which is provided with four concentric rings of magnets 23, 24, 25 and 26, such as might be used to obtain the erection curve shown in Fig. 8 of the drawing. Here the rings of magnets 23, 24, 25 and 26 produce the torque curves H, I, J and K respectively, the resultant of which is indicated by the curve L. If complete turn error compensation is desired for all rates of turn at one predetermined speed, as distinguished from the arrangement illustrated in Figs. 1 to 6 inclusive wherein turn error compensation is obtained for all speeds at one predetermined rate of turn, it can be shown that the erection system should be designed such that the gyro precession rate varies approximately as the tangent of the pendulum tilt angle. Such a relationship is indicated approximately by the curve L of Fig. 8 and it will be clear from the foregoing discussion that by properly selecting the number, strength and spacing of the magnets, such a curve can easily be obtained. The portion of the curve L near the origin is shown as departing from this relationship in that the curve has a hump portion L'. The sharp rise in torque and erection rate near the origin indicated by the portion of the curve L' is usually desirable in the interest of obtaining a sensitive erecting action near the central or neutral position. If the curve L were continued to the origin, as indicated by the dash line L'', the erecting torque would be so low near the neutral position that accurate erection would not be obtained. As indicated in Fig. 8, the hump portion of the curve L' can be very easily obtained, according to my invention, by simply increasing the number or strength of the magnets 23 in the inner ring.

The modified magnet rotor construction shown in Fig. 7 also differs from the construction shown in Figs. 1 to 5 in that there a non-salient magnet pole construction is used. Such a construction is advantageous in some cases for manufacturing reasons and to reduce windage losses.

The erecting device of my invention has the very important advantage that the predetermined erection characteristic, such as, for example, indicated by the curves G and L in Figs. 6 and 8 of the drawing, is not materially affected by variations in the initial setting of the air gap between the eddy current disk and the magnets, since the shape of the erection curve is not dependent upon air gap variation but instead is determined by the pattern of the magnetic field produced by the permanent magnets 11 and 12. Therefore the device is much less sensitive to initial adjustment at the factory and it is therefore much easier to maintain uniform production in mass production of gyroscopes.

Another important advantage of my invention is the fact that erecting action is obtained through a relatively wide range of pendulum displacement angles without the need for the correspondingly large eddy current disk. This advantage arises from the sequential torque-producing action of the magnets in the various rings as the pendulum is displaced from the center position. Since with this arrangement a relatively small eddy current disk may be used, much less difficulty is encountered in connection with the problem of mechanical interference between the swinging pendulum and remaining parts of the gyroscope.

A still further advantage of my invention arises from the fact that the magnets are mounted on the gyroscope and the eddy current disk on the pendulum, instead of the reverse arrangement which has been customary heretofore. With this arrangement permanent magnets may be used which have a relatively high ratio of length to diameter, which results in a much more efficient magnet structure, this advantage being obtained without any increase in the space required for the pendulum swing. As a result of this arrangement, it has been possible to incorporate the erection system in an aircraft instrument artificial horizon gyroscope of reduced overall height so that the instrument can be mounted in a standard instrument panel opening used for other aircraft instruments, which has not been possible heretofore.

A still further advantage of my invention is the fact that the erection characteristic can be easily changed after the gyroscope has been built. This can be accomplished by simply changing the strength of the magnets in one or more of the magnet rings. Thus, for example, if it is found that the torque produced by one of the rings of magnets is too high, a permanent magnet of proper polarity can be held adjacent the magnets in the ring to be changed while the gyroscope is running so that a partial but uniform demagnetization takes place. On the other hand, if the torque produced by a given ring of magnets is too low, the magnetization can be increased to the desired extent by the use of well-known magnetization apparatus.

It should be understood that my invention is not necessarily limited to the illustrated embodiment in which the magnet member is rotated and the eddy current disk is relatively stationary, as obviously the reverse arrangement may be used. Also, if desired, the magnet member 7 may be mounted on the pendulum and the eddy current disk on the gyroscope. The illustrated arrangement is preferred, however, because of space and mechanical interference problems mentioned above.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination with a universally mounted gyroscope of the vertical spin axis type, an eddy current erecting device therefor comprising a magnet member having a plurality of magnets mounted thereon, a conductor member, one of said members being mounted on said gyroscope for rotation with the rotor thereof and the other of said members being pendulously mounted so as to swing adjacent the member mounted on the gyroscope under the influence of gravity, whereby the relative rotation of said members results in eddy currents being induced in said conductor member producing torques tending to erect said gyroscope, said magnets being so positioned on said magnet member that upon relative movement of said magnet and conductor member there is a sequential overlap of the poles of said magnets and said conductor member whereby the erecting torque is maintained over an extended range of relative displacement of said members.

2. In combination with a universally mounted gyroscope of the vertical spin axis type, an eddy current erecting device therefor comprising a magnet member mounted on said gyroscope for rotation with the rotor thereof, a plurality of magnets mounted on said magnet member, a pendulously mounted conductor member arranged to swing adjacent said magnet member whereby eddy currents are induced in said conductor member producing torques tending to erect said gyroscope, said magnets being arranged on said magnet member in concentric circles of different diameters whereby erecting torques are produced over an extended range of relative displacement of said conductor member relative to said magnet member.

3. In combination with a universally mounted gyroscope of the vertical spin axis type, an eddy current erecting device therefor comprising a magnet member connected to said gyroscope so as to rotate therewith about the gyroscope spin axis, a plurality of permanent magnets mounted on said magnet member and arranged in a series of concentric circles so as to produce magnetic fields extending approximately parallel to the gyroscope spin axis whereby rotating magnetic fields are produced which are symmetrical and concentric with the spin axis of the gyroscope upon rotation of said magnet member, a conductor member mounted as a universal pendulum so as to have a normal position of rest symmetrical with the spin axis of the gyroscope when said gyroscope is in the normal erected position, said conductor member having a path of swing traversing the rotating magnetic fields produced by said magnet member whereby eddy currents are induced in said conductor member producing torque tending to maintain said gyroscope in the erected position, said torque being a function of the field pattern produced by said concentrically arranged magnets.

4. In combination with a universally mounted gyroscope of the vertical spin axis type, an eddy current erecting device therefor comprising a rotating magnet member, a conductor member, one of said members being mounted on said gyroscope and the other of said members being mounted as a universal pendulum to swing adjacent to the member mounted on said gyroscope, said rotating magnet member comprising a plurality of permanent magnets arranged so that the poles thereof lie in circles having different diameters, said circles being concentric with the axis of rotation of said magnet member.

5. In combination with a universally mounted gyroscope of the vertical spin axis type, an erecting device therefor comprising a magnet member for producing a magnetic field; a conductor member; one of said members being mounted on said gyroscope for rotation with the rotor thereof and the other of said members being pendulously mounted so as to swing adjacent the member mounted on said gyroscope under the influence of gravity, whereby the relative rotation of said members results in eddy currents being induced in said conductor member producing torques tending to erect said gyroscope; said magnet member including a plurality of permanent magnets arranged at predetermined distances from a center point of said magnet member; the pole strength of said magnets, the number of magnets at each of said distances, and the magnitude of said distances being proportioned to produce a magnetic field in said conductor member the intensity of which varies with the relative displacement between said conductor member and magnet member in such a manner that the erecting torque exerted on said gyroscope is approximately constant over a relatively wide range of variation in said displacement.

6. In combination with a universally mounted gyroscope of the vertical spin axis type, an erecting device therefor comprising a magnet member coupled for rotation with the rotor of said gyroscope for producing a magnetic field; a conductor member pendulously mounted so as to swing adjacent said magnet member under the influence of gravity, whereby the relative rotation of said members results in eddy currents being induced in said conductor member producing torques tending to erect said gyroscope; said magnet member including a plurality of permanent magnets arranged at predetermined radial distances from the axis of rotation of said magnet member; the pole strength of said magnets, the number of said magnets at each of said radial distances, and the magnitude of said radial distances being proportioned to produce a magnetic field in said conductor member the intensity of which varies with the relative displacement between said conductor member and magnet member in such a manner that the erecting torque exerted on said gyroscope is approximately constant over a relatively wide range of variation in said displacement.

7. In combination with a universally mounted gyroscope of the vertical spin axis type, an eddy current erecting device therefore comprising a magnet member for producing a magnetic field; a conductor member; one of said members being mounted on said gyroscope for rotation with the rotor thereof and the other of said members being pendulously mounted so as to swing adjacent the member mounted on said gyroscope under the influence of gravity, whereby the relative rotation of said members results in eddy currents being induced in said gyroscope; said magnet member including a plurality of permanent magnets arranged at predetermined distances from a center point of said magnet member; the pole strength of said magnets, the number of magnets at each of said distances, and the magnitude of said distances being proportioned to produce a magnetic field in said conductor member the intensity of which varies with the relative displacement between said conductor member and magnet member in such a manner that the erecting torque exerted on said gyroscope is approximately proportional to said displacement over a range of normal operation of said device.

8. In combination with a universally mounted gyroscope of the vertical spin axis type, an eddy current erecting device therefor comprising a magnet member coupled for rotation with the rotor of said gyroscope for producing a magnetic field; a conductor member pendulously mounted so as to swing adjacent said magnet member under the influence of gravity, whereby the relative rotation of said members results in eddy currents being induced in said conductor member producing torques tending to erect said gyroscope; said magnet member including a plurality of permanent magnets arranged at predetermined radial distances from the axis of rotation of said magnet member; the pole strength of said magnets, the number of said magnets at each of said radial distances, and the magnitude of said radial distances being proportioned to produce a magnetic field in said conductor member the intensity of which varies with the relative displacement between said conductor member and magnet member in such a manner that the erecting torque exerted on said gyroscope is approximately proportional to said displacement over a range of normal operation of said device.

9. In combination with a universally mounted gyroscope of the vertical spin axis type, an eddy current erecting device therefor comprising a magnet member rotatable with the rotor of said gyroscope; a plurality of magnetic elements supported by said member and arranged to produce magnetic poles at predetermined radial distances from the axis of rotation of said member; a conductor member pendulously mounted to swing adjacent the magnet member under the influence of gravity, whereby the relative rotation of said members results in eddy currents being induced in said conductor member producing torques tending to erect said gyroscope; the strength of each pole, the number of poles at each of said radial distances, and the magnitude of said radial distances being proportioned to product magnetic fields in said conductor member which vary in intensity with the relative displacement between said conductor and magnet members in such a manner that the erecting torque exerted on said gyroscope is a predetermined function of said displacement.

10. The combination as set forth in claim 9, wherein said magnetic elements comprise rod-shaped permanent magnets having their longitudinal axes parallel with the axis of rotation of said magnet member and wherein said permanent magnets are arranged in concentric circles having peripheries at said radial distances.

HARRY C. WENDT.

REFERENCES CITED

The following references are of record in the file of this patent:

UNITED STATES PATENTS

| Number | Name | Date |
|---|---|---|
| 2,360,339 | Hansen | Oct. 17, 1944 |
| 2,365,727 | Pike | Dec. 26, 1944 |
| 2,418,032 | Jewell | Mar. 25, 1947 |

FOREIGN PATENTS

| Number | Country | Date |
|---|---|---|
| 492,670 | Great Britain | Sept. 23, 1938 |